US007408589B2

(12) United States Patent
Ebara et al.

(10) Patent No.: US 7,408,589 B2
(45) Date of Patent: Aug. 5, 2008

(54) VIDEO SIGNAL PROCESSING CIRCUIT, VIDEO DISPLAY, AND DISPLAY DRIVING DEVICE

(75) Inventors: Masami Ebara, Hyogo (JP); Toru Sasaki, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 582 days.

(21) Appl. No.: 11/110,815

(22) Filed: Apr. 21, 2005

(65) Prior Publication Data

US 2005/0237437 A1 Oct. 27, 2005

(30) Foreign Application Priority Data

Apr. 23, 2004 (JP) ............................ 2004-128637
Apr. 23, 2004 (JP) ............................ 2004-128638

(51) Int. Cl.
*H04N 1/393* (2006.01)
*H04N 7/01* (2006.01)

(52) U.S. Cl. ....................... 348/581; 348/561; 348/704; 348/443; 348/445; 382/298

(58) Field of Classification Search ................. 348/581, 348/561, 792, 704, 443, 441, 445; 382/298, 382/299, 300; 345/660, 472
See application file for complete search history.

(56) References Cited

U.S. PATENT DOCUMENTS 5,914,753 A * 6/1999 Donovan .................... 348/441
6,100,870 A * 8/2000 Ohara ........................ 345/670
6,597,402 B1 * 7/2003 Butler et al. ................ 348/447

(Continued)

FOREIGN PATENT DOCUMENTS

JP 5-252486 9/1993

(Continued)

OTHER PUBLICATIONS

Japanese Office Action dated Oct. 9, 2007, issued in corresponding Japanese Patent Application No. 2004-128637.

(Continued)

*Primary Examiner*—David Ometz
*Assistant Examiner*—Jean W Désir
(74) *Attorney, Agent, or Firm*—Westerman, Hattori, Daniels & Adrian, LLP.

(57) ABSTRACT

Provided is a video signal processing circuit capable, in a scale conversion, of rendering a circuit scale small and alleviating a deterioration of a vertical resolution. A vertical scaler is provided with a function of increasing the number of scanning lines of an input video signal. An increasing rate thereof is adjacent to 1.0. In a case that the number of unit output lines is M, the number of unit input lines is N, and the increasing rate is α, a condition of $0<\alpha<2$ is satisfied. That is, α is adjacent to 1.0. A number-of-a-plurality-of-time reading-out circuit performs a reading-out by a 3-time clock toward the input video signal. In addition, the number-of-a-plurality-of-time reading-out circuit is configured in such a manner as not to select the video signal read out by an address overtaking. A horizontal scaler interpolates the number of dots of a horizontal direction according to the number of horizontal dots of a liquid crystal panel.

15 Claims, 13 Drawing Sheets

U.S. PATENT DOCUMENTS 6,831,700 B2 * 12/2004 Hoshikawa ................. 348/446
6,903,733 B1 * 6/2005 Greenberg et al. .......... 345/204

FOREIGN PATENT DOCUMENTS

JP 06-311426 A 11/1994
JP 07-046516 A 2/1995
JP 10-004529 A 1/1998
JP 2000-020709 A 1/2000
JP 2000-338926 A 12/2000

OTHER PUBLICATIONS

Office Action dated Jun. 27, 2006, issued in corresponding Japanese patent application No. 2004-128638.

* cited by examiner

FIG. 8

| PANEL | INPUT VIDEO | | THE NO. OF EFFECTIVE SCANNING LINES OF INPUT IMAGE | DISPLAYED RATE | THE NO. OF DISPLAYED LINES OF PANEL | MAGNIFYING RATE K OF MULTIPLICATION | α |
|---|---|---|---|---|---|---|---|
| VGA | NTSC | NORMAL | 240 | 0.95 | 480 | 2 | 1.05263 |
| | | SQUEEZE | 240 | 0.95 | 360 | 2 | 0.78947 |
| | | SQUEEZE | 240 | 0.95 | 360 | 1 | 1.57895 |
| VGA | PAL | NORMAL | 288 | 0.95 | 480 | 2 | 0.87719 |
| | | SQUEEZE | 288 | 0.95 | 360 | 2 | 0.65789 |
| | | SQUEEZE | 288 | 0.95 | 360 | 1 | 1.31579 |
| XGA 720LINE | NTSC | NORMAL | 240 | 0.95 | 720 | 3 | 1.05263 |
| | | SQUEEZE | 240 | 0.95 | 720 | 3 | 1.05263 |
| | | LETTER BOX (16:9) | 180 | 1.00 | 720 | 3 | 1.33333 |
| XGA 720LINE | PAL | NORMAL | 288 | 0.95 | 720 | 3 | 0.87719 |
| | | SQUEEZE | 288 | 0.95 | 720 | 3 | 0.87719 |
| | | LETTER BOX (16:9) | 216 | 1.00 | 720 | 3 | 1.11111 |
| | | LETTER BOX (14:9) | 246 | 1.00 | 720 | 3 | 0.97561 |
| XGA 768LINE | NTSC | NORMAL | 240 | 0.95 | 768 | 3 | 1.12281 |
| | | SQUEEZE | 240 | 0.95 | 768 | 3 | 1.12281 |
| | | LETTER BOX (16:9) | 180 | 1.00 | 768 | 3 | 1.42222 |
| XGA 768LINE | PAL | NORMAL | 288 | 0.95 | 768 | 3 | 0.93567 |
| | | SQUEEZE | 288 | 0.95 | 768 | 3 | 0.93567 |
| | | LETTER BOX (16:9) | 216 | 1.00 | 768 | 3 | 1.18519 |
| | | LETTER BOX (14:9) | 246 | 1.00 | 768 | 3 | 1.04065 |

VIDEO SIGNAL PROCESSING CIRCUIT, VIDEO DISPLAY, AND DISPLAY DRIVING DEVICE

BACKGROUND OF THE INVENTION

Field of the Invention

The present invention relates to a video signal processing circuit, a video display, and a display driving device used for applying a scale conversion to a video signal so as to drive a display, and so on.

Regarding the number of dots of a liquid crystal panel, there are standards such as a VGA, an XGA, a WXGA, and others, for example. A resolution of a VGA panel is vertical 480 lines/horizontal 640 dots, and that of the XGA is vertical 768 lines/horizontal 1024 dots. On the other hand, for a video signal, there are standards such as an NTSC, a PAL, and others. In a case of the NTSC, the resolution is vertical 240 lines/horizontal 720 dots. Due to this, in a case of driving the liquid crystal panel by the video signal, it is needed to convert (apply a scale conversion to) the number of horizontal dots and the number of vertical dots of the video signal into the resolution according to the liquid crystal panel.

Regarding a scale conversion method, there is a method in which after a 480 I (interlace) signal is once up-converted to a 480 P (progressive) signal, the number of scanning lines is increased to the resolution of the panel by using a vertical-direction scaler (see Japanese Patent Application Laying-open No.H5-252486). Regarding a horizontal direction, an ordinary interpolating filter is used so as to increase the number of horizontal dots to a predetermined panel horizontal resolution.

SUMMARY OF THE INVENTION

In a conventional scale conversion method, for up-converting a 480 I (interlace) signal into a 480 P signal, a movement-adaptive sequential scanning conversion is used. This conversion requires a large-capacity memory, and a complicated signal processing circuit. In addition, in this conversion, in a moving portion, a sequential scanning for averaging upper scanning-line information and lower scanning-line information is carried out, so that a preferred video is obtained in a still video. However, in a moving video portion, obtained is a video in which a vertical resolution is decreased to half, thus a video quality is greatly deteriorated.

On the other hand, as a method for carrying out the scale conversion on a small circuit scale, there is a method in which a vertical-direction interpolating filter is used, and regarding a video signal having 240 lines in 1 field, the number of scanning lines of the video signal is increased to the number of lines of the liquid crystal panel. However, in this method, a number-of-line increasing rate is large, so that a great deterioration is occurred to the vertical resolution.

In view of the above-described circumstance, it is an object of the present invention to provide a video signal processing circuit, a video display, and a display driving device, capable of rendering a circuit scale small, and alleviating a deterioration of the vertical-direction resolution.

In order to solve the above-described challenge, a video signal processing circuit of the present invention is a video signal processing circuit for applying a scale conversion to a video signal, and comprises a vertical scaler in which a number-of-line increasing rate $\alpha$ of with respect to the video signal is set to $0<\alpha<2$, and a reading-out circuit for reading out the same line of the video signal output from the vertical scaler for one or a plurality of times during one horizontal period.

In addition, a video signal processing circuit of the present invention is a video signal processing circuit for applying a scale conversion to a video signal, and comprises a reading-out circuit for reading out the same line of the video signal for one or a plurality of times during one horizontal period, and a vertical scaler in which a number-of-line increasing rate $\alpha$ with respect to the video signal output from the reading-out circuit is set to $0<\alpha<2$.

A video signal processing circuit of these configurations may have a horizontal scaler for converting the number of dots of a horizontal direction with respect to the video signal. In addition, the number-of-line increasing rate $\alpha$ of the vertical scaler may be selected within a range from about 0.66 to about 1.58.

Furthermore, the video display of the present invention is provided with any one of the video signal processing circuits described above, and configured as to supply an output video signal from the video signal processing circuit to a hold-type display panel such as a liquid crystal panel, and others.

In addition, in order to solve the above-described challenge, a display driving device of the present invention is a display driving device for applying a scale conversion to a video signal so as to drive a display, and comprises a vertical scaler in which a number-of-line increasing rate $\alpha$ with respect to the video signal is set to $0<\alpha<2$, and a timing controller for writing continuously or simultaneously the same line of a video signal output from the vertical scaler into one or a plurality of lines of a display.

A display driving device of the above configuration may have a horizontal scaler for converting the number of dots of a horizontal direction with respect to the video signal according to the number of horizontal dots of the display. In addition, a number-of-line increasing rate of the vertical scaler may be selected within a range from about 0.66 to about 1.58. Furthermore, the display may be a hold-type display panel such as a liquid crystal panel, and others.

According to the present invention, in the scale conversion, it is possible to exhibit desired effects such as rendering a circuit scale small, and alleviating a deterioration of the vertical resolution.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a descriptive diagram showing a relationship among resolutions of various kinds of video display panels, formats of various kinds of video signals, the number of effective scanning lines of an input video, a displayed rate, the number of displayed lines of a panel, a magnifying rate K of a number-of-a-plurality-of-time reading-out circuit, and an increasing rate α;

DESCRIPTION OF THE PREFERRED EMBODIMENTS

A First Embodiment

Below, a first embodiment of the present invention will be described based on from FIG. 1 to FIG. 8.

Figure 1:
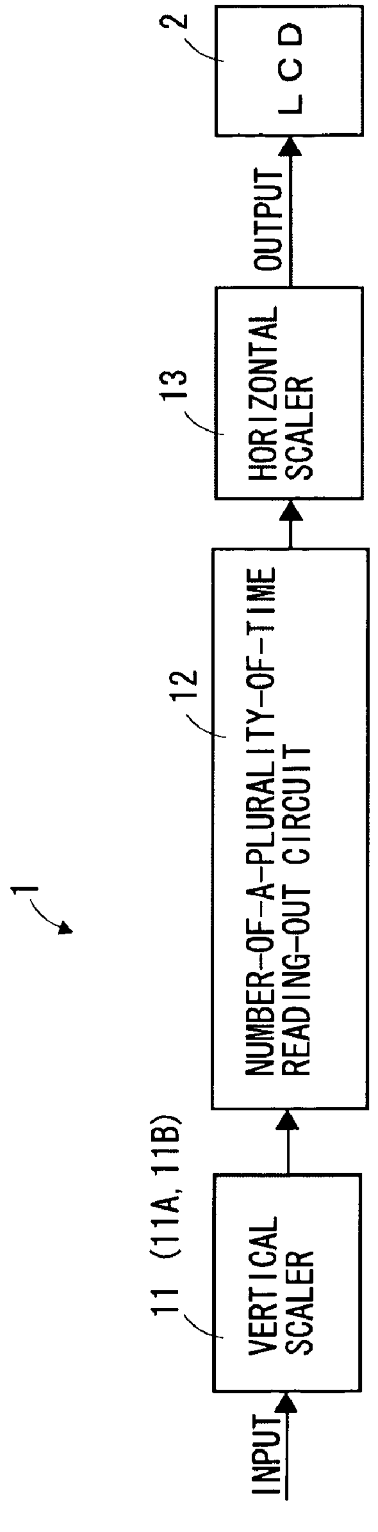
FIG. 1 is a block diagram showing a video display and a video signal processing circuit of an embodiment of the present invention.

FIG. 1 is a block diagram showing a video display. This video display is formed of a video signal processing circuit 1, and a liquid crystal display panel (LCD) 2. The video signal processing circuit 1 is formed of a vertical scaler 11 (11A, or 11B), a number-of-a-plurality-of-time reading-out circuit 12, and a horizontal scaler 13. An input video signal is a digitized video signal (a video signal formed of a luminance signal and a color difference signal, or a video signal formed of an RGB signal, and so on), and input into the vertical scaler 11. The vertical scaler 11 is provided with a function of increasing the number of scanning lines of the input video signal. However, an increasing rate of the number of scanning lines is adjacent to 1.0. In a case that the number of unit output lines from the vertical scaler 11 is M, the number of unit input lines to the vertical scaler 11 is N, and the increasing rate is α, for example, a condition of $0<\alpha<2$ ($\alpha=M/N$)

is satisfied. That is, α is to be adjacent to 1.0. It is noted that in this embodiment, α is not equal (≠) to 1.

Figure 2:
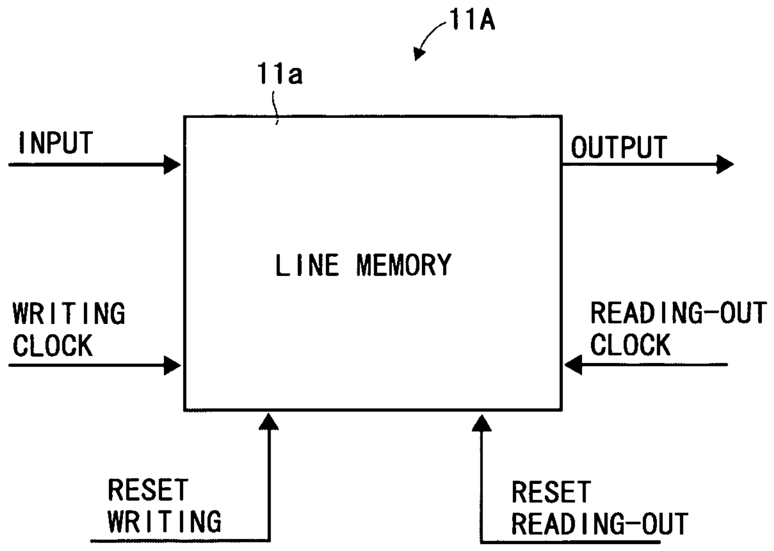
FIG. 2 is a descriptive diagram showing one example of a vertical scaler.
Figure 3:
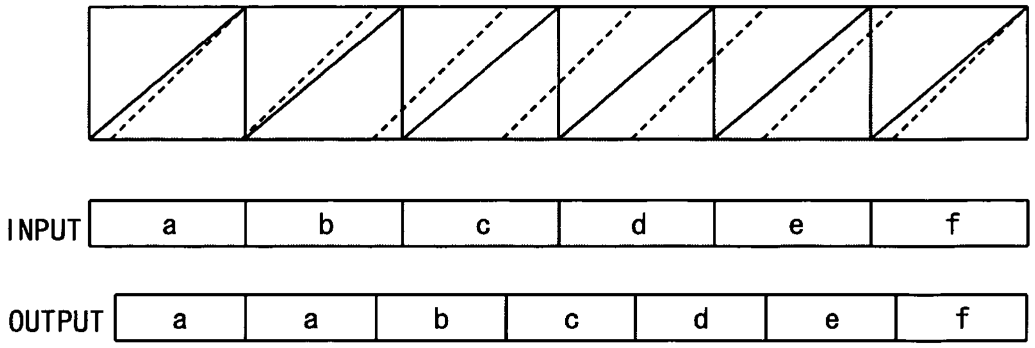
FIG. 3 is a descriptive diagram showing a relationship between an input and an output of the vertical scaler in FIG. 2.
Figure 4:
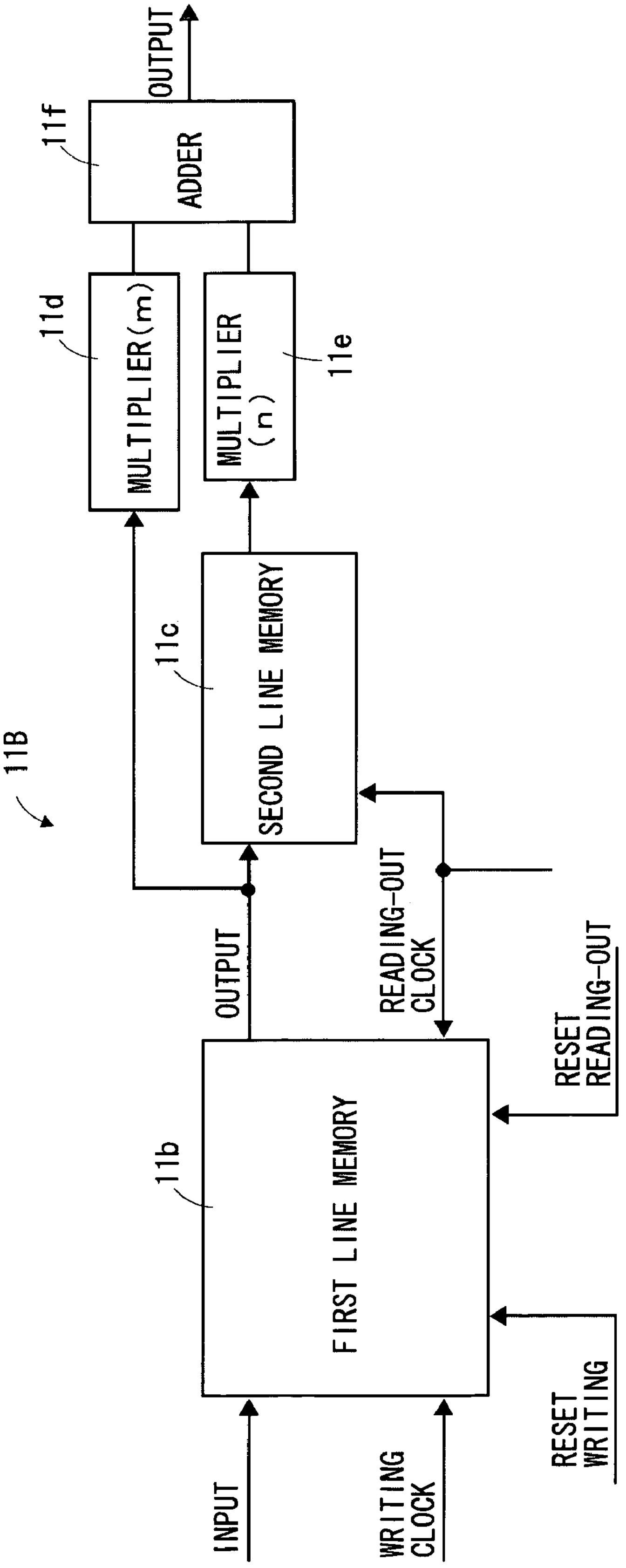
FIG. 4 is a descriptive diagram showing another example of the vertical scaler.

As the vertical scaler 11, the vertical scaler 11A shown in FIG. 2, or the vertical scaler 11B shown in FIG. 4 is adopted. Of course, the scalers are not limited thereto. The vertical scaler 11A is formed of being provided with one line memory 11*a*. FIG. 3 shows an operation timing chart of the line memory 11*a*. Herein, a horizontal axis is a time period, and a vertical axis is an address value of the line memory 11*a*. Solid lines indicate write addresses, and dotted lines indicate read addresses. Each of a, b, c, . . . in an inputting and an outputting indicates a one-line video signal. In this example, an example of M=6, and N=5 is shown, and a is equal (=) to 1.2.

In FIG. 3, if the output of the line memory 11*a* is observed, the one-line video (a) is read out twice, and other one-line videos (b to e) are read out once. As a result, the number of scanning lines is increased from 5 to 6.

The vertical scaler 11B shown in FIG. 4 has a circuit configuration capable of preventing the one-line video (a) from being output twice. The vertical scaler 11B is formed of being provided with a first line memory 11*b*, a second line memory 11*c*, a first multiplier 11*d*, a second multiplier 11*e*, and an adder 11*f*. The first line memory 11*b* operates similar to a case of the above-described line memory 11*a*. An output of the first line memory 11*b* is input into the first multiplier 11*d* and the second line memory 11*c*. The second line memory 11*c* outputs input data by delaying only by one horizontal period in a read system. Of the first line memory 11*b* and the second line memory 11*c*, a vertical-direction interpolating filter is constituted.

The data delayed by the second line memory 11*c* is input into the second multiplier 11*e*. The first multiplier 11*d* multiplies the input data from the first line memory 11*b* by m-time and outputs the multiplied data, and the second multiplier 11*e* multiplies the input data from the second line memory 11*c* by n-time and outputs the multiplied data. The adder 11*f* inputs the m-time output data and the n-time output data, and outputs a value to which these data are added.

Figure 5:
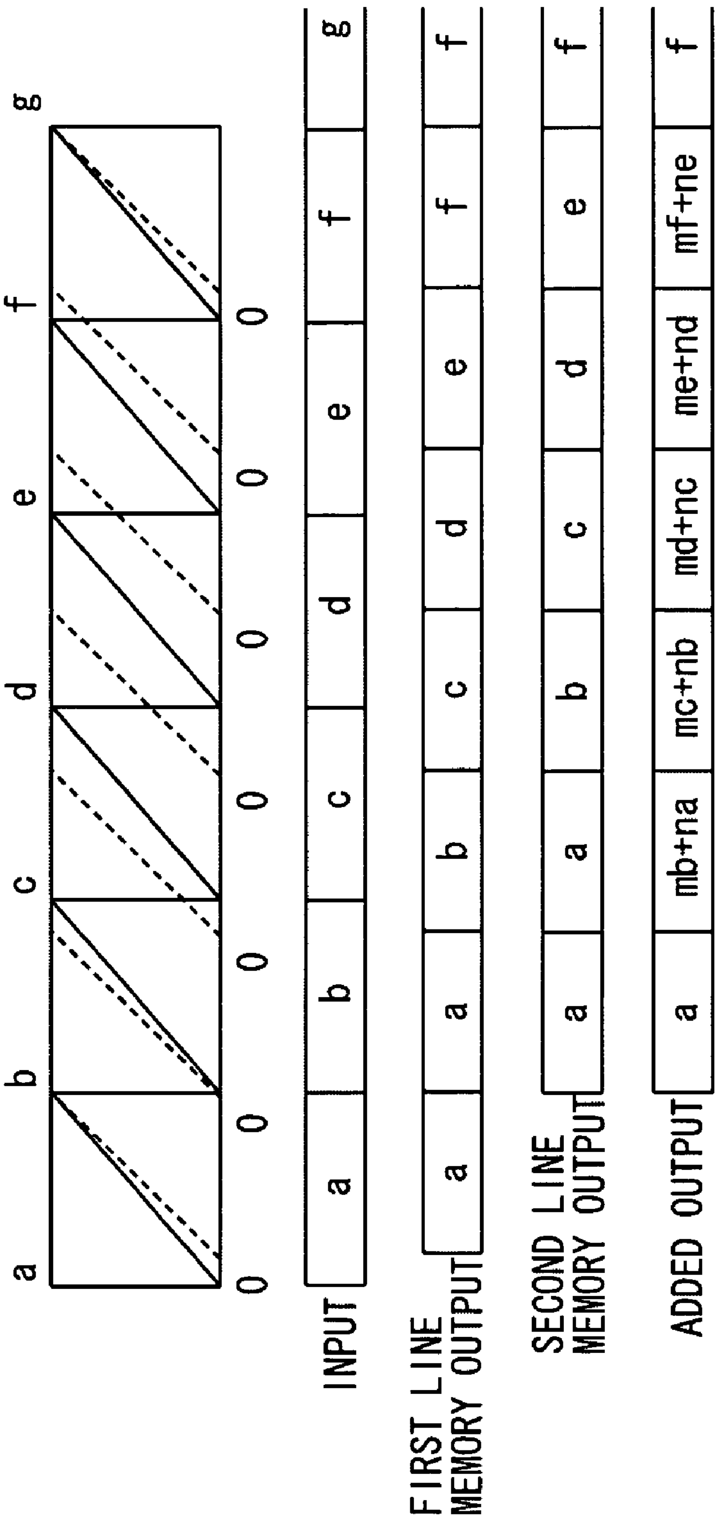
FIG. 5 is a descriptive diagram showing a relationship between an input and an output of the vertical scaler in FIG. 4.

FIG. 5 is an operation timing chart of the vertical scaler 11B. A horizontal axis is a time period, and a vertical axis is an address value of the line memory. Solid lines indicate write addresses, and dotted lines indicate read addresses. As understood from FIG. 5, the vertical scaler 11B does not allow the same video signal to be output for two consecutive times. As multiplication coefficients (m), (n) of the multipliers 11*d*, 11*e*, a constant that interpolates linearly a signal of two scanning lines is selected, for example. For example, m=0.5, and n=0.5 may be adopted.

In order to constitute an interpolating filter having a more preferred characteristic, a line memory may be further dependently connected to the final stage of the second line memory 11*c*.

Figure 6:
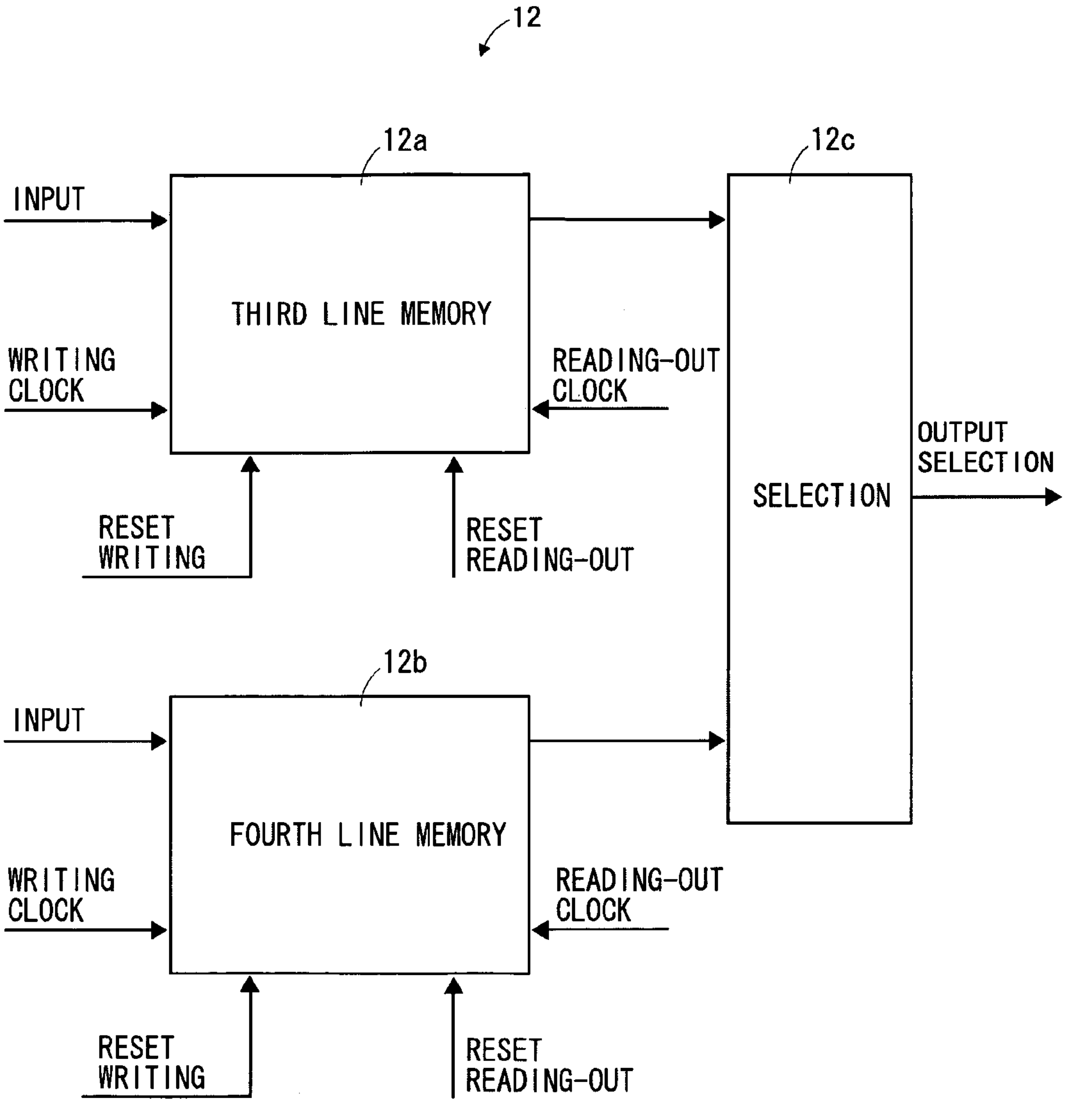
FIG. 6 is a circuit diagram showing a number-of-a-plurality-of-time reading-out circuit.

FIG. 6 is a block diagram showing the number-of-a-plurality-of-time reading-out circuit 12. This number-of-a-plurality-of-time reading-out circuit 12 is formed of being provided with a third line memory 12*a*, a fourth line memory 12*b*, and a selection circuit 12*c*. The third line memory 12*a* and the fourth line memory 12*b* take turns from one line to another carrying out a writing of the video signal from the vertical scaler 11 by an input system clock (corresponds to writing clocks of the first line memory 11*b* and the second line memory 11*c*). Furthermore, a reading-out is carried out by a clock that is an integral multiple of this writing clock (one time, two times, three times, and so on, for example).

Figure 7:
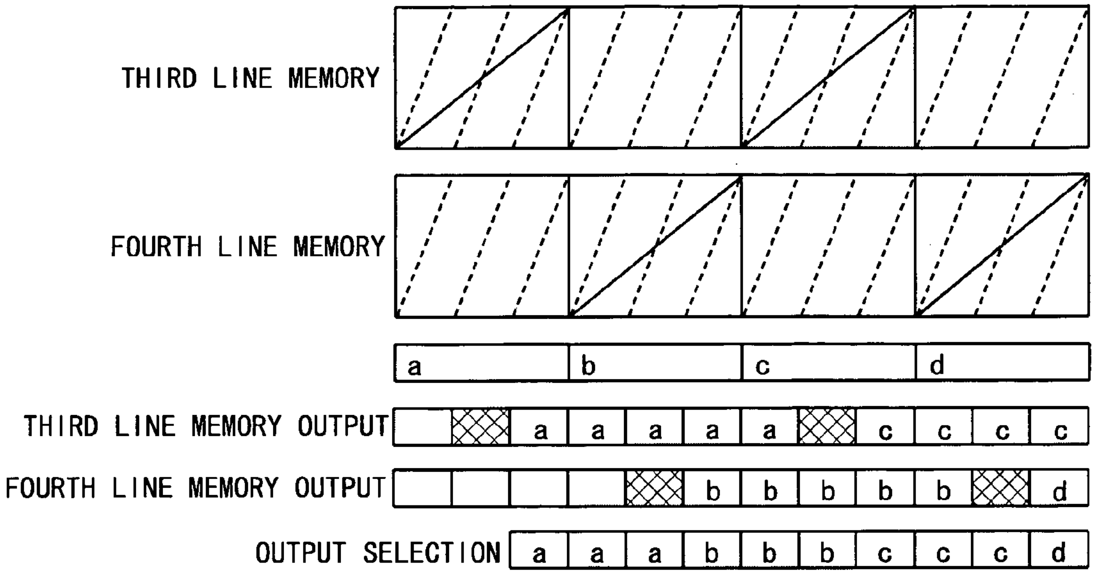
FIG. 7 is a timing chart showing an operation of the number-of-a-plurality-of-time reading-out circuit.

FIG. 7 is a timing chart showing a process of the number-of-a-plurality-of-time reading-out circuit 12. In this example, the reading-out is carried out by a 3-time clock. In a case of carrying out the reading-out by a 3-time speed, a rate of the reading-out is 3/1, and therefore 3 minus (−) 1 is equal (=) to 2. As a result, an address overtaking occurs. Thus, the third line memory 12*a*, and the fourth line memory 12*b* are arranged in parallel. The selection circuit 12*c* selects the same video signal read out three times from the third line memory 12*a*, and outputs the selected video signal. Thereafter, the selection circuit 12*c* switches to a side of the fourth line memory 12*b*, selects the same video signal read out three times from the fourth line memory 12*b*, and outputs the selected video signal. Furthermore, the selection circuit 12*c* switches to a side of the third line memory 12*a* once again, and repeats a similar switching process. That is, the number-of-a-plurality-of-time reading-out circuit 12 is constituted of carrying out the reading-out by the 3-time clock, and not selecting the video signal read out by the address overtaking.

The horizontal scaler 13 inputs the video signal from the number-of-a-plurality-of-time reading-out circuit 12, and converts the number of horizontal dots of this video signal into the number of horizontal dots of the liquid crystal panel 2. In a case that the liquid crystal panel 2 is the XGA panel, for example, an input signal (720 dots) is converted into a horizontal resolution (1024 dots) of the XGA panel. For this conversion, a one-dimensional interpolating filter may be used.

As described above, the number of total output video scanning lines M' at the final stage in the above described system may be expressed as:

$$M'=N'\times\alpha\times K=N'\times(M/N)\times K$$

Herein, N' is the number of total input video scanning lines. K is the number of multiplication (magnifying rate) in the number-of-a-plurality-of-time reading-out circuit 12, and has a value of K=1, 2, 3, . . . (natural number).

If a case of displaying an NTSC signal having 240 lines in 1 field on the VGA panel is taken into consideration, $$\alpha=20/19=1.05263$$

and if K=2, the number of total output video scanning lines M' is as follows:

$$M'=240\times\alpha\times K=240\times1.0526\times2=505 \text{ lines.}$$

Since the vertical resolution of the VGA panel is 480 lines, the remaining 25 lines (505−480=25) are not displayed on the panel, i.e., a situation where 95% of an entire video is displayed. Generally, similar to a case of a CRT television, too, and if the input video signal is displayed 100%, as in a case of a time of a VTR reproduction, when a signal of which synchronization is unstable, e.g., completely not conforming to the NTSC (PAL) standard, is displayed, a noise is displayed in some cases, and therefore, a displayed area, which is less than 100%, that is, normally, a portion equal to or less than an entire portion of the video, needs to be displayed on the panel.

In addition, if a display on the XGA panel (vertical resolution=768) is taken into consideration, $$\alpha=9/8=1.125$$

$$K=3$$

The number of total scanning lines M'=α×3×240=1.125×3×240=810

A displayed rate=768/810=0.948.

FIG. 8 is a descriptive diagram showing a relationship among resolutions of various kinds of video display panels, formats of various kinds of video signals, the number of effective scanning lines of the input video, a displayed rate, the number of displayed lines of panels, a magnifying rate K of the number-of-a-plurality-of-time reading-out circuit, and an increasing rate α. The increasing rate α may be selected within a range from about 0.66 to about 1.58. Incidentally, the number of scanning lines of the NTSC is 525, and the number of scanning lines of the PAL is 625 lines. In a case of the NTSC, based on (525/2)×(22/21)=275, the number of output lines from the vertical scaler is an integer (a numerator is M, and a denominator is N). In addition, in a case of the PAL, if (625/2)×(even number/(5, or 25 or 125 or 625)), the number of output lines from the vertical scaler is an integer. As a result of the number of the scanning lines being the integer, it becomes easier to create a circuit. In FIG. 8 described above, in a case of creating a value having the increasing rate α close to 0.87719, if the denominator=5, and the numerator=4, α is equal (=) to 0.8. Furthermore, if the denominator=25, and the numerator=22, α is equal (=) to 0.88. Either may adopt. In addition, if the denominator=25, and the numerator=24, α is equal (=) to 0.96, and the displayed rate may be 0.86. It is noted that the displayed rate of the display panels differs depending on each manufacturer, and is generally within a range from 0.9 to 0.95.

As described above, the vertical scaler 11 having the increasing rate α of 0<α<2 (that is, α is approximate to 1.0) is used, so that it is possible to render a deterioration of a video small, and a circuit scale small. Furthermore, the number-of-a-plurality-of-time reading-out circuit 12 is used by being brought into a combination with this vertical scaler 11, it becomes possible to realize a vertical scaling process that is finally needed, and render very small the circuit scale.

It is noted that in the above-described examples, although the number-of-a-plurality-of-time reading-out circuit 12 is provided at the final stage of the vertical scaler 11, this is not always the case, and an arranging relationship between the vertical scaler 11 and the number-of-a-plurality-of-time reading-out circuit 12 may be reversed. In addition, in the above descriptions, an example in which the liquid crystal panel is driven is shown, and however, this is not always the case. The video display of the present invention is capable of improving the video quality, particularly, in a case of being provided with a so-called hold-type display element such as a liquid crystal panel, and driving the element.

A Second Embodiment

Below, an embodiment of the present invention will be described based on FIG. 9 to FIG. 15.

Figure 9:
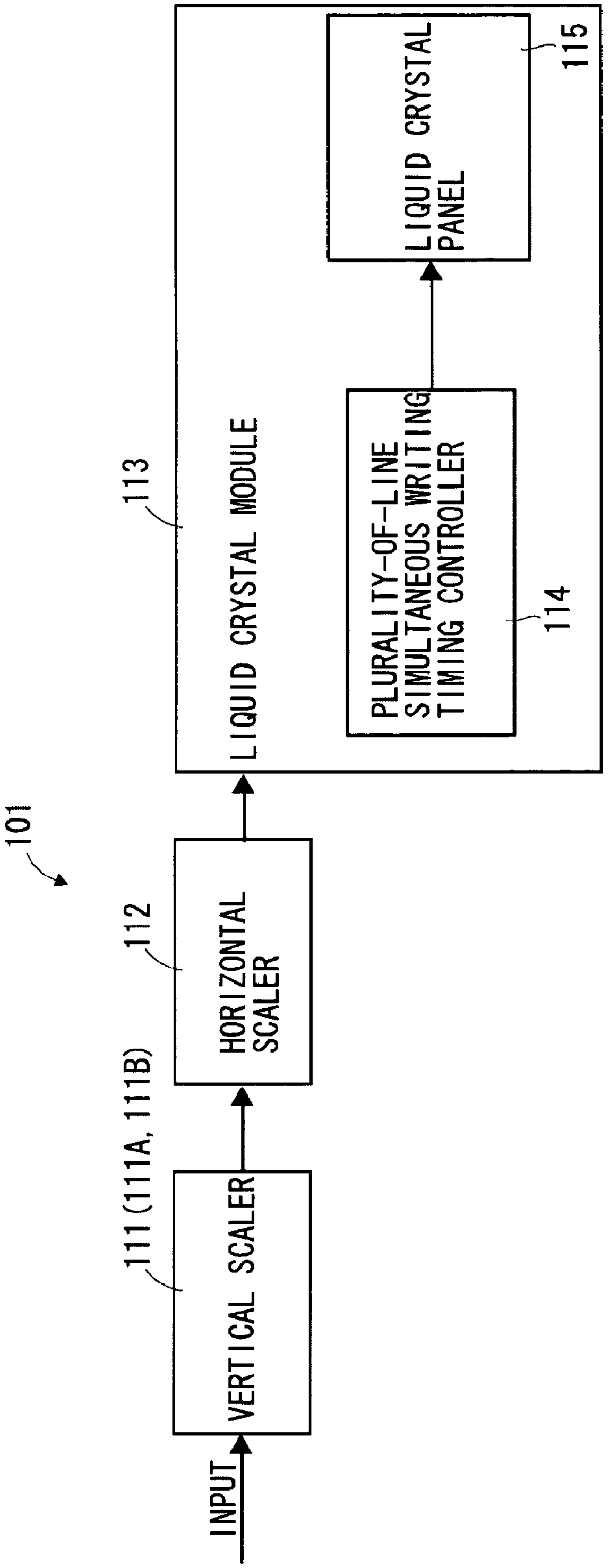
FIG. 9 is a block diagram showing a display driving device of an embodiment of the present invention.

FIG. 9 is a block diagram showing a display driving device 101 that drives a liquid crystal panel 115. The video signal to be input is a digitized video signal (a video signal formed of a luminance signal and a color difference signal, and a video signal formed of an RGB signal, and so on). The video signal is input into vertical scalers 111 (111A, 111B) of the display driving device 101. The vertical scaler 111 is provided with a function of increasing the number of scanning lines of the video signal. However, an increasing rate of the number of scanning lines is adjacent to 1.0. In a case that the number of unit output lines from the vertical scaler 111 is M, the number of unit input lines to the vertical scaler 111 is N, and the increasing rate is α, for example, a condition of $$\alpha=M/N$$

$$0<\alpha<2$$

is satisfied. That is, α is to be adjacent to 1.0. It is noted that in this embodiment, α is not equal (≠) to 1.

Figure 10:
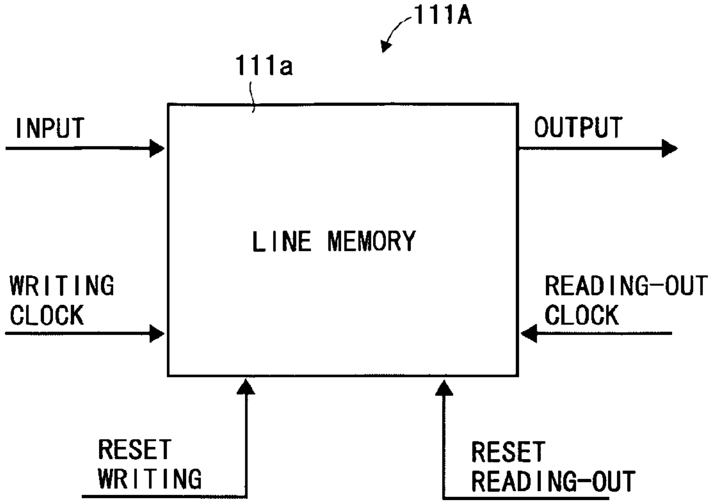
FIG. 10 is a descriptive diagram showing one example of the vertical scaler.
Figure 11:
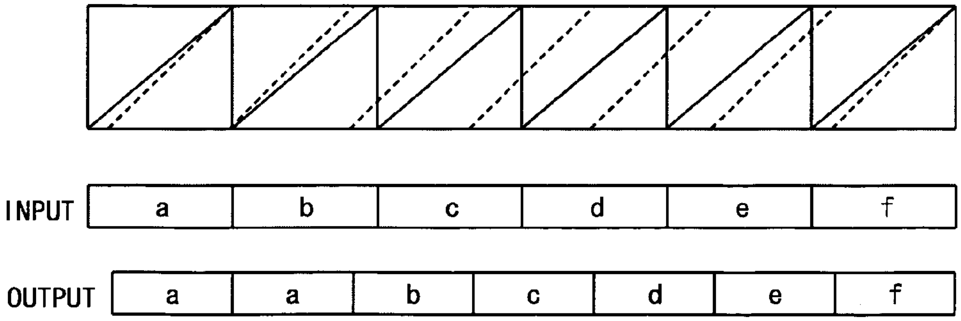
FIG. 11 is a descriptive diagram showing a relationship between an input and an output of the vertical scaler in FIG. 10.
Figure 12:
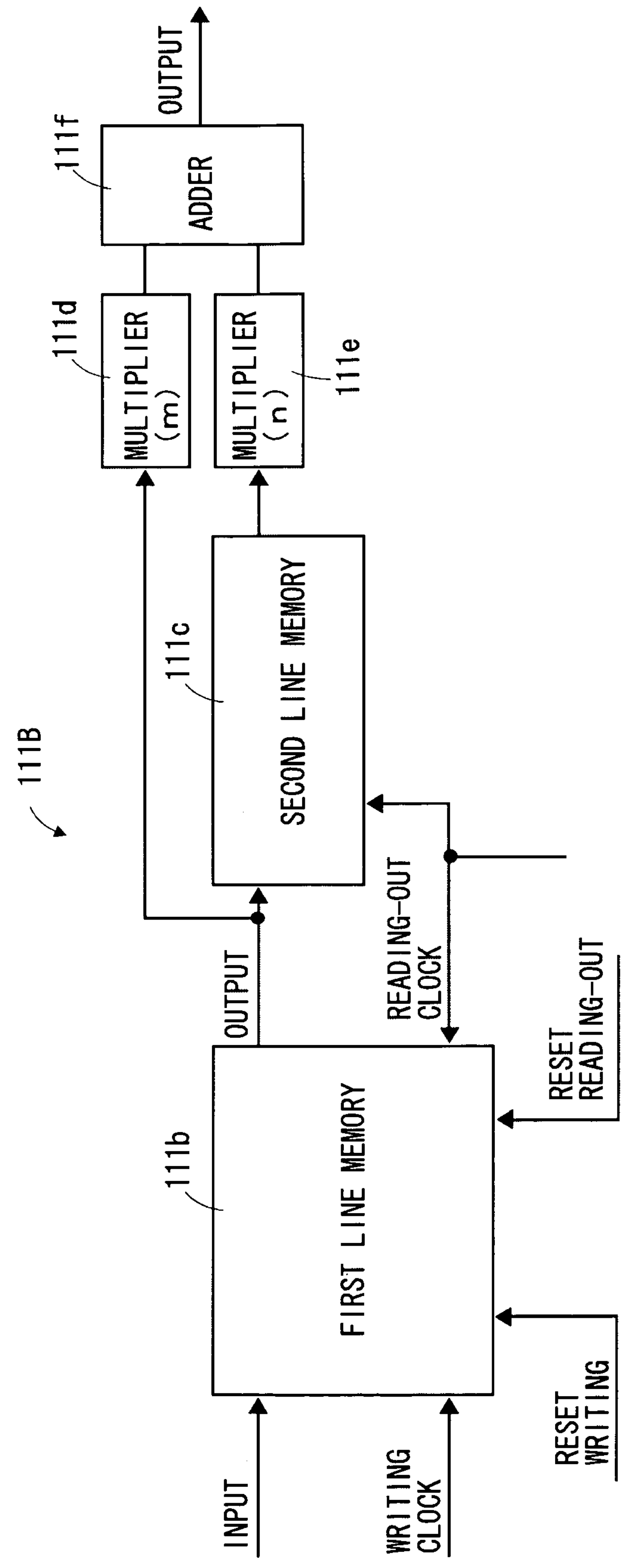
FIG. 12 is a descriptive diagram showing another example of the vertical scaler.

As the vertical scaler 111, the vertical scaler 111A shown in FIG. 10 or the vertical scaler 111B shown in FIG. 12 is adopted. Of course, the vertical scalers are not limited thereto. The vertical scaler 111A is configured of being provided with one line memory 111*a*. FIG. 11 shows an operation timing chart of the line memory 111*a*. Herein, a horizontal axis is a time period, and a vertical axis is an address value of the line memory 111*a*. Solid lines indicate write addresses, and dotted lines indicate read addresses. Each of a, b, c, . . . in an inputting and an outputting indicates one-line video signal. In this example, an example of M=6, N=5 is shown, and a is equal (=) to 1.2.

In FIG. 11, if an output of the line memory 111*a* is observed, a one-line video (a) is read out twice, and other one-line videos (b to e) are read out once. As a result, the number of scanning lines is increased from 5 to 6.

The vertical scaler 111B shown in FIG. 12 has a circuit configuration capable of preventing the one-line video (a) from being output twice. The vertical scaler 111B is formed of being provided with a first line memory 111*b*, a second line memory 111*c*, a first multiplier 111*d*, a second multiplier 111*e*, and an adder 111*f*. The first line memory 111*b* operates similar to a case of the above-described line memory 111*a*. An output of the first line memory 111*b* is input into the first multiplier 111*d* and the second line memory 111*c*. The second line memory 111*c* outputs input data by delaying only by one horizontal period in a read system. Of the first line memory 111*b* and the second line memory 111*c*, a vertical-direction interpolating filter is constituted.

The data delayed by the second line memory 111*c* is input into the second multiplier 111*e*. The first multiplier 111*d* multiplies the input data from the first line memory 111*b* by m-time and outputs the multiplied data, and the second multiplier 111*e* multiplies the input data from the second line memory 111*c* by n-time and outputs the multiplied data. The adder 111*f* inputs the m-time output data, and the n-time output data, and outputs a value to which these data are added.

Figure 13:
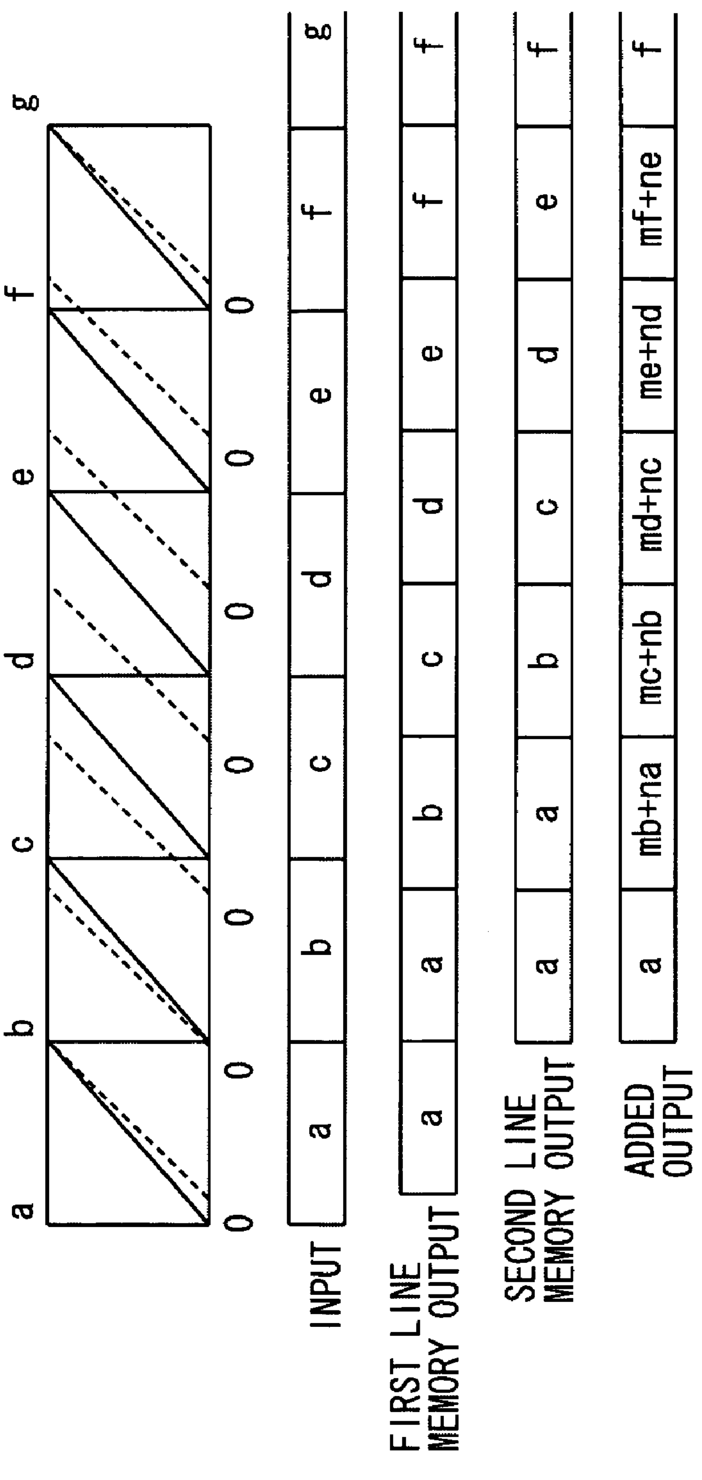
FIG. 13 is a descriptive diagram showing a relationship between an input and an output of the vertical scaler in FIG. 12.

FIG. 13 is an operation timing chart of the vertical scaler 111B. A horizontal axis is a time period, and a vertical axis is an address value of the line memory. Solid lines indicate write addresses, and dotted lines indicate read addresses. As understood from FIG. 13, the vertical scaler 111B does not allow the same video signal to be output for two consecutive times. As multiplication coefficients (m), (n) of the multipliers 111*d*, 111*e*, a constant that applies a linear interpolation to the scanning line signal of two lines is selected, for example. For example, m=0.5, and n=0.5 may be adopted.

In order to constitute an interpolating filter having a more preferred characteristic, a line memory may be further dependently connected to the final stage of the second line memory 111*c*.

The horizontal scaler 112 converts the number of horizontal dots of the video signal input from the vertical scaler 111 into the number of horizontal dots of liquid crystal panel 115. In a case that the liquid crystal panel 115 is an XGA panel, for example, the input signal (720 dots) is converted into a horizontal resolution (1024 dots) of the XGA panel. For this conversion, a one-dimensional interpolating filter may be used.

Figure 14:
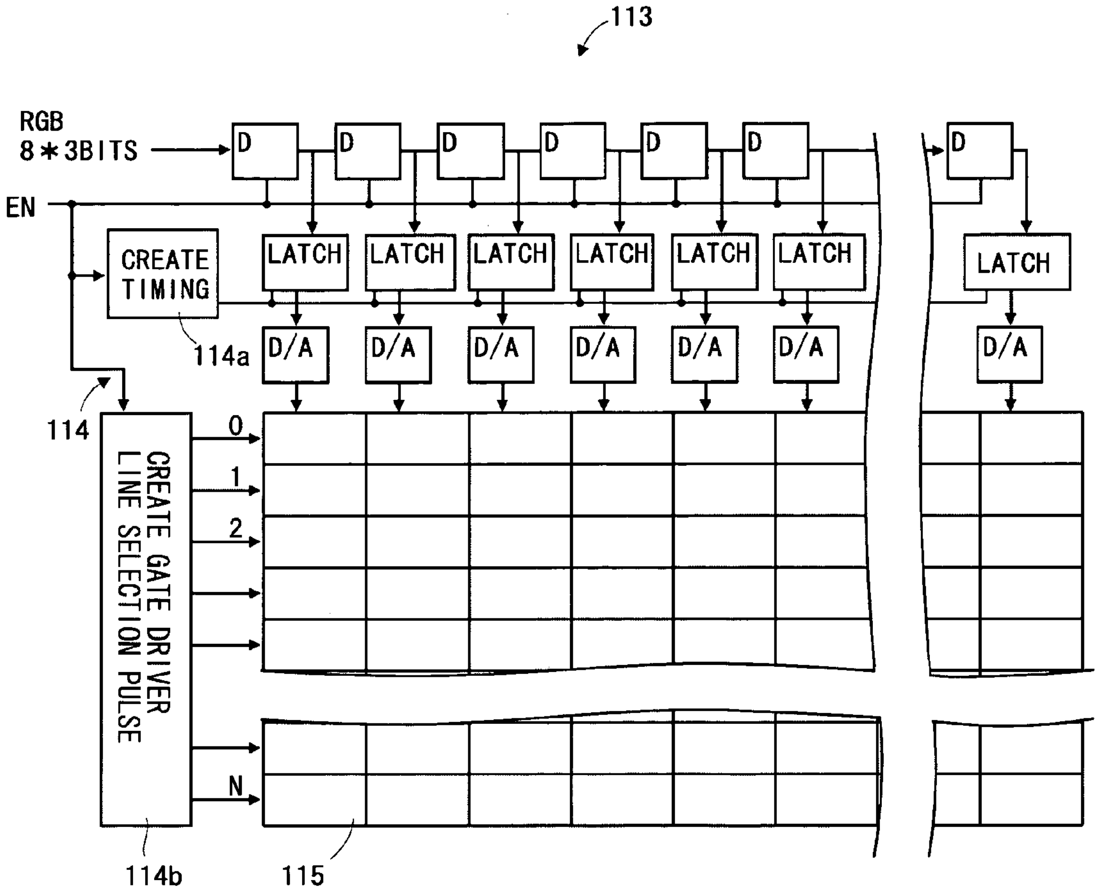
FIG. 14 is a circuit diagram showing a liquid crystal module.
Figure 15:
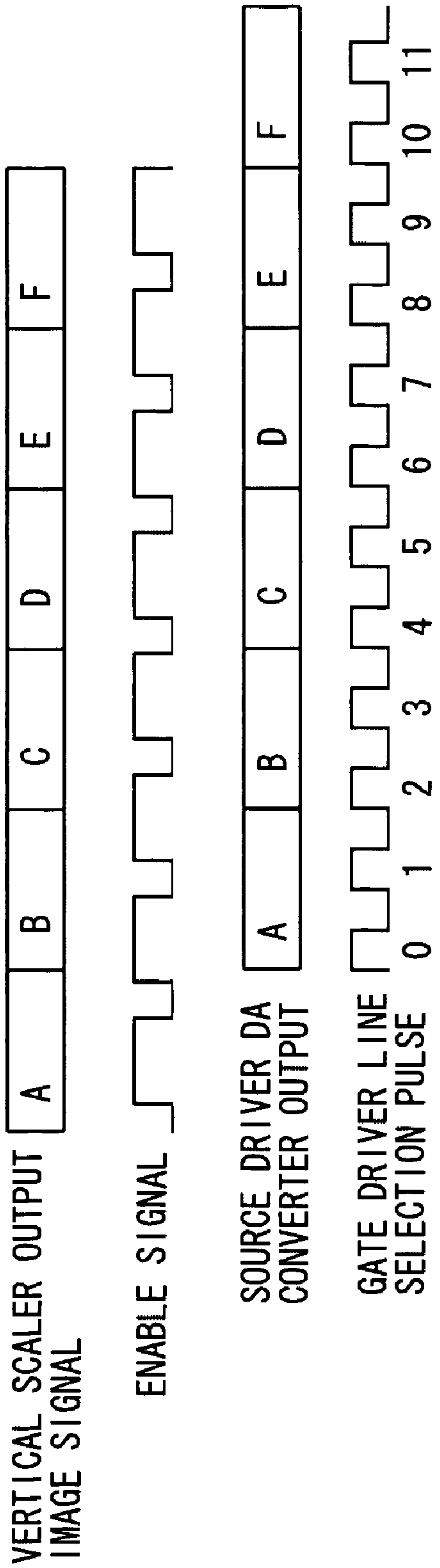
FIG. 15 is a timing chart showing an operation of the liquid crystal module.

FIG. 14 is a circuit diagram showing a timing controller (hereinafter, briefly referred to as a controller) 114 capable of simultaneously writing a plurality of lines, and the liquid crystal panel 115 in a liquid crystal module 113. In addition, FIG. 15 is a timing chart showing an operation of the above-described controller 114.

By using both FIG. 14 and FIG. 15, an operation of a plurality-of-line simultaneous writing will be described. Normally, the input signal is a digital signal formed of three data, i.e., R data, G data, and B data, each of which is 8 bits. First, a normal video display method will be described. At a time of an enable signal EN is high, the input signal is sequentially shifted in a shift register. In addition, at a time that the shift of the video signal worth one line is completed, each data is fetched within a latch circuit by a latch pulse output from a timing creating circuit 114*a*. At this time, if the line number selected by a gate driver line selection pulse creating circuit 114*b* is 0 (zero), the video signal that is D/A (digital and analog)-converted is written into a line 0 (zero). Similarly, the number of lines to be selected is sequentially shifted to 1, 2, 3, and the video is displayed on the panel. Herein, the number of the shift registers and D/A converters is coincident with the horizontal resolution of the panel, and in a case of the XGA panel, the number of the shift registers and D/A converters is 1024. Furthermore, the number of vertical lines is 768. In the plurality-of-line simultaneous writing, as shown in FIG. 15, when an output of the D/A converter is a video A, the line 0 and the line 1 are selected, and the video A is written into the line 0 and the line 1. Similarly, when the output of the D/A converter is a video B, the lines 2 and 3 are selected, and the video B is written into the line 2 and the line 3. In this example, the video is simultaneously written into two lines, and the same principle is adaptable in a case of a three-lines simultaneously writing, or a four-lines simultaneously writing.

As described as above, the number of total output video scanning lines M' at the final stage in the above-described system can be expressed as follows:

$$M'=N'\times\alpha\times K=N'\times(M/N)\times K.$$

Herein, N' is the number of total input video scanning lines, K is the number of simultaneous writings by the controller 114, and has a value (natural number) of K=1, 2, 3, . . . .

If a case of displaying an NTSC signal having 240 lines in 1 field on the VGA panel is taken into consideration, $\alpha$=20/19=1.05263, and if K=2, the number of total output video scanning lines M' is $$M'=240\times\alpha\times K=240\times1.0526\times2=505 \text{ lines.}$$

Since the vertical resolution of the VGA panel is 480 lines, the remaining 25 lines (505−480=25) are not displayed on the panel, i.e., a situation where 95% of an entire video is displayed. Generally, similar to a case of a CRT television, too, and if the input video signal is displayed 100%, as in a case of at a time of a VTR reproduction, when a signal of which synchronization is unstable, e.g., completely not conforming to the NTSC (PAL) standard, is displayed, a noise is displayed in some cases, and therefore, a displayed area, which is less than 100%, that is, normally, a portion equal to or less than an entire portion of the video, needs to be displayed on the panel.

In addition, if a display on the XGA panel (vertical resolution=768) is taken into consideration, $\alpha$=9/8=1.125

K=3

The number of total scanning lines $M'=\alpha\times3\times240=1.125\times3\times240=810$ A displayed rate=768/810=0.948.

FIG. 8 shown in the embodiment 1 is adaptable in this embodiment, too.

As described above, the vertical scaler 111 having the increasing rate $\alpha$ of $0<\alpha<2$ (that is, $\alpha$ is approximate to 1.0) is used, so that it is possible to render a deterioration of a video quality small, and a circuit scale small. Furthermore, the plurality-of-line simultaneous writing controller 114 is used by being brought into a combination with this vertical scaler 111, and thus, it becomes possible to realize a vertical scaling process that is finally needed, and render very small the circuit scale.

It is noted that in the above description, an example in which the liquid crystal panel is driven, and however, this is not always the case. The display driving device of the present invention is capable of improving the video quality, in particular, in a case of being provided with a so-called hold-type display element such as a liquid crystal panel, and driving the element.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video signal processing circuit for applying a scale conversion to a video signal, comprising:

a vertical scaler in which a number-of-line increasing rate $\alpha$ with respect to said video signal is set to $0<\alpha<2$, wherein the $\alpha$ being a ratio of the number of unit output lines from the vertical scaler to the number of unit input lines to the vertical scaler; and a reading-out circuit for reading out the same line of the video signal output from said vertical scaler for one or a plurality of times during one horizontal period.

2. A video signal processing circuit for applying a scale conversion to a video signal, comprising:

a reading-out circuit for reading out the same line of said video signal for one or a plurality of times during one horizontal period; and a vertical scaler in which a number-of-line increasing rate $\alpha$ with respect to the video signal output from said reading-out circuit is set to $0<\alpha<2$, wherein the $\alpha$ being a ratio of the number of unit output lines from the vertical scaler to the number of unit input lines to the vertical scaler.

3. A video signal processing circuit according to claim 1, having a horizontal scaler for converting the number of dots of a horizontal direction with respect to said video signal.

4. A video signal processing circuit according to claim 2, having a horizontal scaler for converting the number of dots of a horizontal direction with respect to said video signal.

5. A video signal processing circuit according to any one of claims 1 to 4, wherein the number-of-line increasing rate a of the vertical scaler is selected within a range from about 0.66 to about 1.58.

6. The video display provided with the video signal processing circuit according to any one of claims 1 to 4, and configured as to supply an output video signal from the video signal processing circuit to a hold-type display panel such as a liquid crystal panel, and others.

7. The video display provided with the video signal processing circuit according to claim 5, and configured as to supply an output video signal from the video signal processing circuit to a hold-type display panel such as a liquid crystal panel, and others.

8. A video signal processing circuit according to claim 1, wherein said vertical scaler is provided with a plurality of line memories and an adder which adds outputs from said line memories, wherein the reading-out circuit is provided with a plurality of line memories and a selection circuit which selects outputs from said line memories.

9. A video signal processing circuit according to claim 2, wherein said vertical scaler is provided with a plurality of line memories and an adder which adds outputs from said line memories, wherein the reading-out circuit is provided with a plurality of line memories and a selection circuit which selects outputs from said line memories.

10. A display driving device for applying a scale conversion to a video signal so as to drive a display, comprising:

a vertical scaler in which a number-of-line increasing rate a with respect to said video signal is set to $0<\alpha<2$, wherein the $\alpha$ being a ratio of the number of unit output lines from the vertical scaler to the number of unit input lines to the vertical scaler; and a timing controller for writing continuously or simultaneously the same line of a video signal output from said vertical scaler into one or a plurality of lines of a display.

11. A display driving device according to claim 10, having a horizontal scaler for converting the number of dots of a horizontal direction with respect to said video signal according to the number of horizontal dots of said display.

12. A display driving device according to claims 10 or 11, wherein the number-of-line increasing rate of the vertical scaler is selected within a range from about 0.66 to about 1.58.

13. A display driving device according to claims 10 or 11, wherein said display panel is a hold-type display panel such as a liquid crystal panel, and others.

14. A display driving device according to claim 12, wherein said display panel is a hold-type display panel such as a liquid crystal panel, and others.

15. A display driving device according to claim 10, wherein said vertical scaler is provided with a plurality of line memories and an adder which adds outputs from said line memories.

* * * * *